United States Patent
Patton, Jr.

(10) Patent No.: US 10,258,153 B2
(45) Date of Patent: Apr. 16, 2019

(54) METHODS AND ASSEMBLY FOR USE IN STORING OR TRANSPORTING VEHICLE SEATS

(71) Applicant: The Boeing Company, Huntington Beach, CA (US)

(72) Inventor: Robert J. Patton, Jr., Issaquah, WA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 14/661,097

(22) Filed: Mar. 18, 2015

(65) Prior Publication Data

US 2016/0272420 A1 Sep. 22, 2016

(51) Int. Cl.
*B64F 5/50* (2017.01)
*A47B 51/00* (2006.01)
*B64D 11/06* (2006.01)

(52) U.S. Cl.
CPC .............. *A47B 51/00* (2013.01); *B64D 11/06* (2013.01); *B64F 5/50* (2017.01)

(58) Field of Classification Search
CPC ........... A47B 51/00; B64F 5/50; B65D 11/06; B65G 47/244; B65G 47/56; B65G 47/57; B65G 67/08; B65G 67/02; B65G 17/32; B65G 17/46; B65G 17/12
See application file for complete search history.

(56) References Cited

U.S. PATENT DOCUMENTS

| | | | | |
|---|---|---|---|---|
| 2,995,236 A * | 8/1961 | Berger | .................... | B65G 47/57 198/801 |
| 4,082,179 A * | 4/1978 | Beyer | .................... | B65G 19/02 198/801 |
| 4,621,972 A * | 11/1986 | Grotte | ....................... | B60P 1/64 280/414.5 |
| 4,733,767 A * | 3/1988 | Anderson | ................. | B64F 1/32 198/304 |
| 5,101,964 A * | 4/1992 | Westphal | .............. | B23P 19/001 108/55.5 |
| 5,141,128 A * | 8/1992 | Pippin | .................... | B65G 17/16 198/801 |
| 5,984,077 A * | 11/1999 | Frye | ......................... | B60P 1/36 198/317 |

(Continued)

FOREIGN PATENT DOCUMENTS

| | | |
|---|---|---|
| CN | 2934141 Y | 8/2007 |
| CN | 101489890 A | 7/2009 |
| CN | 202296063 U | 7/2012 |

OTHER PUBLICATIONS

China Office Action for related application 201610102241.6 dated Dec. 28, 2018; 17 pp.

*Primary Examiner* — Lynn E Schwenning
(74) *Attorney, Agent, or Firm* — Armstrong Teasdale LLP (57) ABSTRACT

An assembly for use in storing or transporting vehicle seats is provided. The apparatus includes a base portion, an arm portion extending from the base portion, and a conveyor mechanism coupled to the arm portion. The conveyor mechanism includes a frame, and a plurality of fastening devices configured to couple the vehicle seats to the conveyor mechanism, wherein the plurality of fastening devices are rotatable relative to the frame such that the vehicle seats are positionable at different locations along the frame.

8 Claims, 8 Drawing Sheets

(56) References Cited

U.S. PATENT DOCUMENTS

| | | | | |
|---|---|---|---|---|
| 6,591,976 B1* | 7/2003 | Barnett | ............... | B65G 17/12 |
| | | | | 198/728 |
| 6,659,402 B1 | 12/2003 | Prochaska | | |
| 6,808,057 B1* | 10/2004 | Nirmal | ............... | B64F 1/315 |
| | | | | 198/300 |
| 7,226,264 B2* | 6/2007 | Eggleston | ............... | B62B 3/002 |
| | | | | 414/334 |
| 7,513,353 B2* | 4/2009 | Bolen | ............... | G07F 5/02 |
| | | | | 194/334 |
| 7,513,354 B1 | 4/2009 | Canapa | | |
| 8,733,533 B1* | 5/2014 | Duran | ............... | B65G 21/12 |
| | | | | 198/316.1 |
| 9,061,830 B2* | 6/2015 | Miller | ............... | B65G 17/46 |
| 2003/0029700 A1* | 2/2003 | Miller | ............... | B65G 17/12 |
| | | | | 198/803.7 |
| 2004/0079620 A1* | 4/2004 | Aleshire | ............... | A47B 49/00 |
| | | | | 198/711 |
| 2005/0002771 A1* | 1/2005 | Gelli | ............... | B65H 15/02 |
| | | | | 414/758 |
| 2005/0163602 A1* | 7/2005 | Warlow | ............... | B65D 19/08 |
| | | | | 414/528 |
| 2012/0024738 A1* | 2/2012 | Herman | ............... | B60P 1/486 |
| | | | | 206/459.1 |
| 2014/0123462 A1* | 5/2014 | Rollfink | ............... | B64D 11/06 |
| | | | | 29/428 |
| 2014/0197012 A1* | 7/2014 | Miller | ............... | B65G 17/46 |
| | | | | 198/469.1 |

* cited by examiner

METHODS AND ASSEMBLY FOR USE IN STORING OR TRANSPORTING VEHICLE SEATS

BACKGROUND

The field of the present disclosure relates generally to vehicle manufacturing and, more specifically, to an apparatus and methods of storing or transporting interior commodities for installation within a vehicle, such as an aircraft.

At least some known interior commodities to be installed within a vehicle are delivered to and stored by a vehicle manufacturer prior to installation thereof. For example, interior commodities such as vehicle seats are typically delivered to the manufacturer and stored in a warehouse prior to installation within the vehicle. Vehicle seats are typically expensive and can be damaged while in storage or while being installed within the vehicle. For example, in the case of aircraft manufacturing, the vehicle seats are manually loaded onto a conveyor system for transport towards a fuselage of the aircraft. Such installation processes can be a time-consuming and laborious task. Moreover, relatively large vehicles, such as aircraft, can each include up to hundreds of vehicle seats. As such, storage costs and storage space requirements increase when manufacturing multiple relatively large vehicles at the same location.

BRIEF DESCRIPTION

In one aspect, an assembly for use in storing or transporting vehicle seats is provided. The apparatus includes a base portion, an arm portion extending from the base portion, and a conveyor mechanism coupled to the arm portion. The conveyor mechanism includes a frame, and a plurality of fastening devices configured to couple the vehicle seats to the conveyor mechanism, wherein the plurality of fastening devices are rotatable relative to the frame such that the vehicle seats are positionable at different locations along the frame.

In another aspect, a method of storing interior commodities for use in a vehicle is provided. The method includes coupling a first interior commodity to a conveyor mechanism, actuating the conveyor mechanism such that the first interior commodity moves from a first height relative a ground level to a greater second height relative to the ground level, coupling a second interior commodity to the conveyor mechanism at the first height relative to the ground level, and orienting the conveyor mechanism such that a major axis of the conveyor mechanism is in a substantially vertical orientation.

In yet another aspect, a method of installing interior commodities within a vehicle is provided. The method includes positioning a conveyor mechanism adjacent to the vehicle, wherein the conveyor mechanism includes the interior commodities coupled thereto, actuating the conveyor mechanism such that a first interior commodity is in an unloading position relative to the vehicle, offloading the first interior commodity towards the vehicle, and actuating the conveyor mechanism such that a second interior commodity is in the unloading position relative to the vehicle.

DETAILED DESCRIPTION

The implementations described herein relate to an assembly and methods of storing, transporting, or installing interior commodities within a vehicle. Interior commodities can include vehicle seats, overhead storage bins, paneling, or any other commodity typically used within a vehicle. The apparatus includes a conveyor mechanism that stores the interior commodities thereon. The conveyor mechanism is selectively oriented between a substantially vertical position when storing the interior commodities and a substantially horizontal position when transporting the interior commodities, for example. The conveyor mechanism is actuatable such that the interior commodities are positionable at different locations about the conveyor mechanism, which facilitates loading and unloading of the interior commodities therefrom. Moreover, when in the substantially vertical orientation, a storage footprint of the interior commodities is reduced when compared to a similar number of interior commodities individually stored on a storage facility floor. As used herein, "storage footprint" refers to an area measured in units squared occupied by an object or a plurality of objects.

Figure 1:
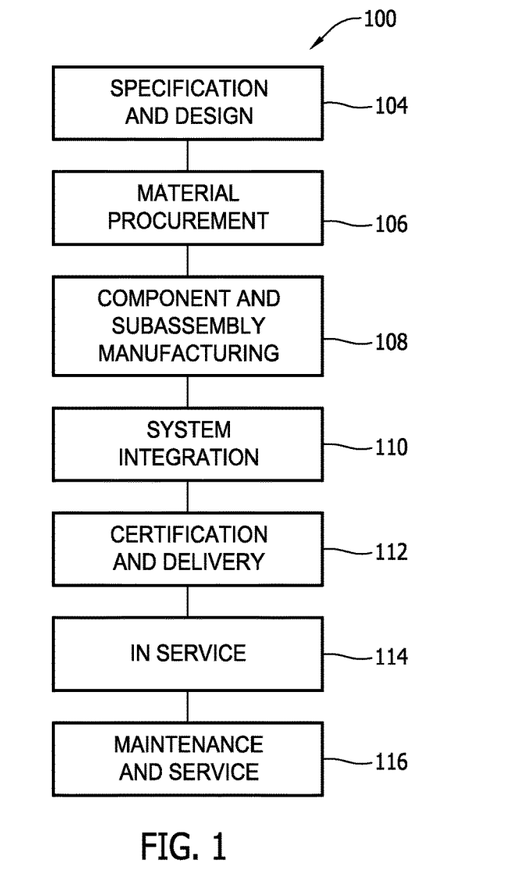
FIG. 1 is a flow diagram of an exemplary aircraft production and service method.
Figure 2:
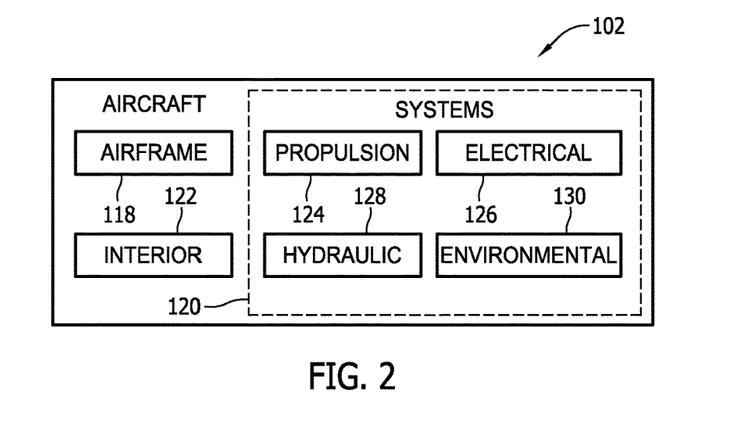
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
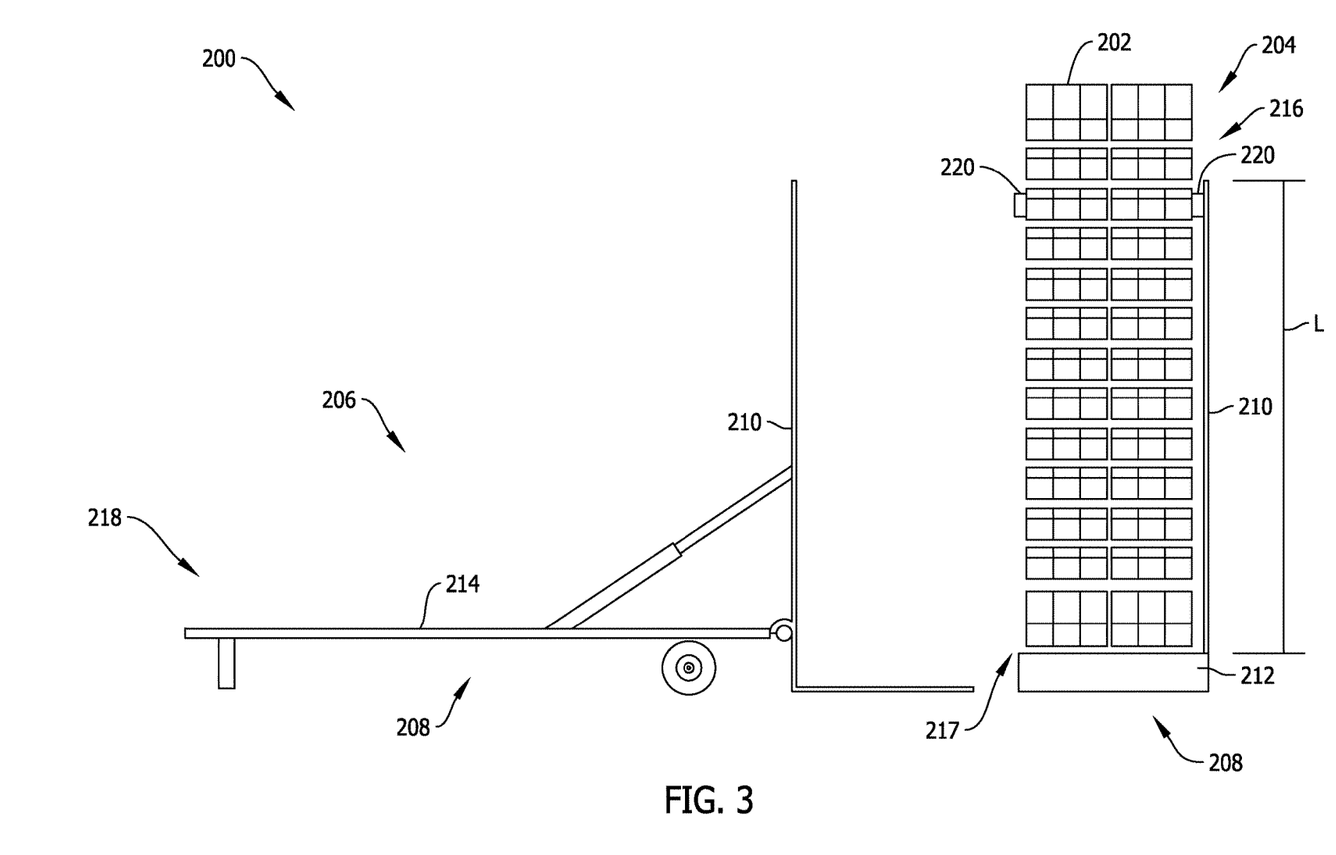
FIG. 3 is a schematic illustration of an exemplary assembly for storing or transporting vehicle seats.

FIG. 3 is a schematic illustration of an exemplary assembly 200 for storing or transporting vehicle seats 202. In the exemplary implementation, assembly 200 includes a stationary sub-assembly 204 and a mobile sub-assembly 206. Each sub-assembly 204 and 206 includes a base portion 208 and an arm portion 210 extending from base portion 208. More specifically, base portion 208 in stationary sub-assembly 204 is a stationary platform 212, and base portion 208 in mobile sub-assembly 206 is a mobile platform 214. Assembly 200 also includes a conveyor mechanism 216 that selectively couples to arm portions 210 of each sub-assembly 204 and 206, as will be described in more detail below. Conveyor mechanism 216 includes a major axis and a minor axis (not shown in FIG. 3), such that conveyor mechanism 216 has an elongated shape. As such, when coupled to stationary sub-assembly 204, the elongated shape of conveyor mechanism 216 facilitates reducing a storage footprint of stationary sub-assembly 204 when compared to a storage footprint of a similar number of vehicle seats 202 individually stored on a ground level 218 of a storage facility, for example. As used herein, "ground level" refers to an area or height of an area accessible to an operator standing on a floor of a storage facility, for example.

More specifically, stationary sub-assembly 204 includes stationary platform 212 and arm portion 210 extending from stationary platform 212 in a substantially normal direction from ground level 218. When coupled to arm portion 210 of stationary sub-assembly 204, the major axis of conveyor mechanism 216 is substantially aligned with a length L of arm portion 210. As such, in the exemplary implementation, the major axis of conveyor mechanism 216 is also in a substantially vertical orientation, which facilitates reducing the storage footprint of stationary sub-assembly 204. For example, as shown, stationary sub-assembly 204 has a storage footprint of less than about 150 square feet. Moreover, while shown as being positioned on ground level 218, it should be understood that base portion 208 of stationary sub-assembly 204 can be any stabilizing structure for stationary sub-assembly 204 that enables assembly 200 to function as described herein.

In some implementations, conveyor mechanism 216 is actuatable to enable vehicle seats 202 to be loaded thereon. For example, as will be described in more detail below, a loading position 217 on conveyor mechanism 216 is defined at a height substantially aligned with ground level 218 such that loading position 217 is easily accessible to an operator. Loading position 217 is also generally defined at an empty portion (not shown) along conveyor mechanism 216 such that vehicle seats 202 can be loaded thereon.

In one implementation, in operation, mobile sub-assembly 206 is positionable adjacent to stationary sub-assembly 204 to facilitate loading or unloading of conveyor mechanism 216. More specifically, conveyor mechanism 216 includes a coupling member 220 that enables conveyor mechanism 216 to be selectively coupled to arm portions 210 of stationary sub-assembly 204 or mobile sub-assembly 206. As mobile sub-assembly 206 is moved into position relative to stationary sub-assembly 204, conveyor mechanism 216 couples to arm portion 210 of mobile sub-assembly 206, and uncouples from arm portion 210 of stationary sub-assembly 204. Mobile platform 214 can then transport vehicle seats 202 on conveyor mechanism 216 to one or more vehicle manufacturing locations or between storage facilities, for example. In an alternative implementation, base portion 208 of stationary sub-assembly 204 is selectively movable between one or more vehicle manufacturing locations or between storage facilities.

Figure 4:
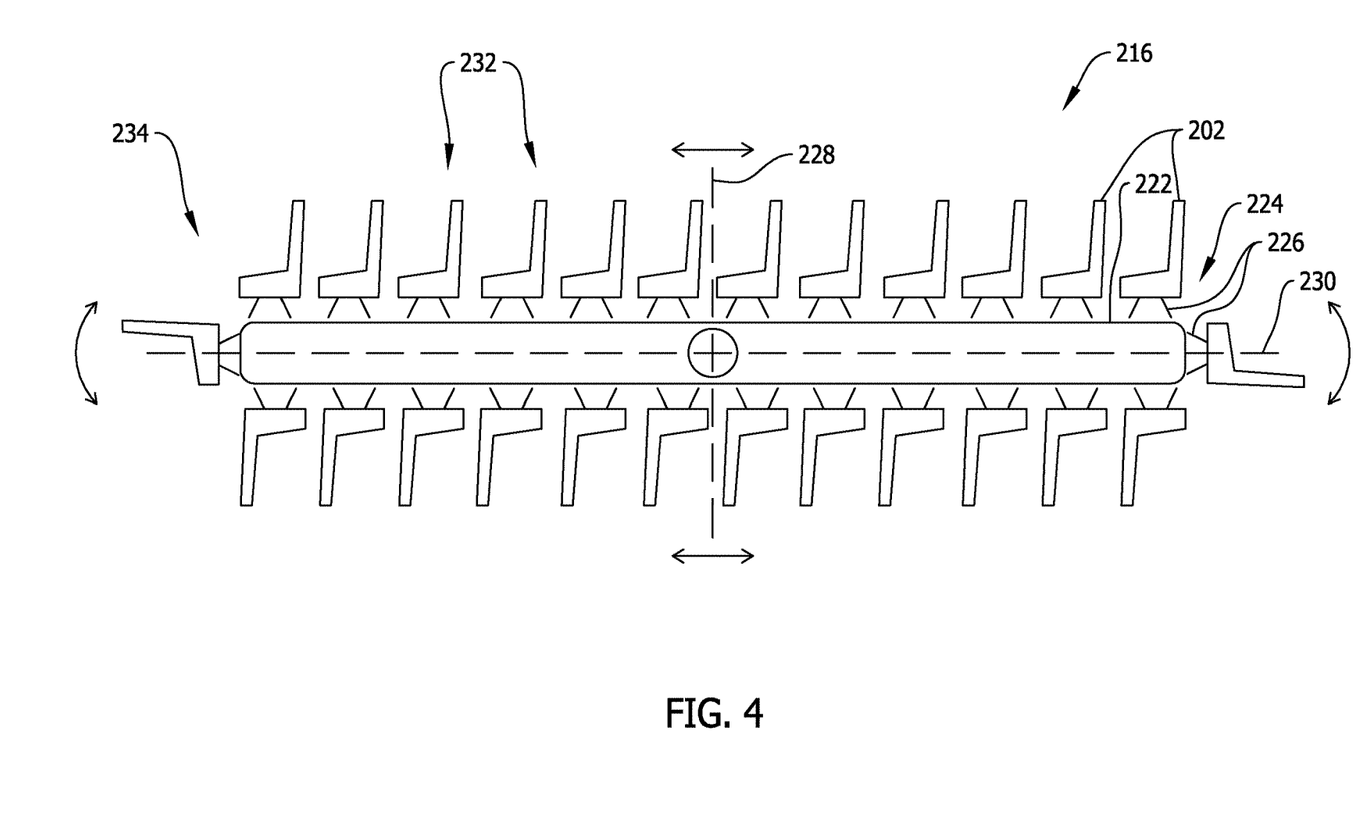
FIG. 4 is a schematic side view illustration of a conveyor mechanism that may be used with the assembly shown in FIG. 3.

FIG. 4 is a schematic side view illustration of conveyor mechanism 216 that may be used with assembly 200 (shown in FIG. 3). In the exemplary implementation, conveyor mechanism 216 includes a frame 222 and a plurality of fastening devices 224 that couple vehicle seats 202 to conveyor mechanism 216. More specifically, as will be described in more detail below, fastening devices 224 include an interface that mates with at least one leg 226 of vehicle seats 202. Alternatively, the interface is designed to mate with a seat track fitting or other similar device for coupling vehicle seats 202 to conveyor mechanism 216. The plurality of fastening devices 224 are rotatable relative to frame 222 such that vehicle seats 202 are positionable at different locations along frame 222. Conveyor mechanism 216 is selectively operable to rotate vehicle seats 202 in either a clockwise or counterclockwise direction relative to frame 222.

In the exemplary implementation, conveyor mechanism 216 is a motorized device that induces rotation of fastening devices 224 relative to frame 222. Fastening devices 224 are coupled to frame 222 using any mechanism that allows fastening devices 224 to rotate relative to frame 222, and that enables assembly 200 to function as described herein. For example, conveyor mechanism 216 may be embodied as, but not limited to, a conveyor belt type device, a cable and pulley type device, or a sprocket and chain type device. As such, fastening devices 224 are defined along a track (not shown) within frame 222 that guides fastening devices 224 along a predefined path as vehicle seats 202 are rotated in either the clockwise or counterclockwise direction.

Moreover, as described above, conveyor mechanism 216 includes a major axis 230 and a minor axis 228 shorter than major axis 230. As such, conveyor mechanism 216 has an elongated shape that enables its storage footprint to be reduced when conveyor mechanism 216 is in a substantially vertical orientation. It should also be understood that any number of vehicle seats 202 may be coupled to conveyor mechanism 216 based on the lengths of major and minor axes 230 and 228.

In the exemplary implementation, fastening devices 224 are oriented such that vehicle seats 202 are arranged in a plurality of rows 232 when coupled to conveyor mechanism 216. For example, referring to FIG. 3, each row 232 of vehicle seats 202 includes three vehicle seats 202 substantially aligned across frame 222. Moreover, fastening devices 224 are oriented such that the plurality of rows 232 of vehicle seats 202 are arranged in series along an outer portion 234 of frame 222. As such, conveyor mechanism 216 is able to rotate each row 232 of vehicle seats 202 into an unloading position (not shown in FIG. 4) relative to frame 222 in a more efficient manner.

Figure 5:
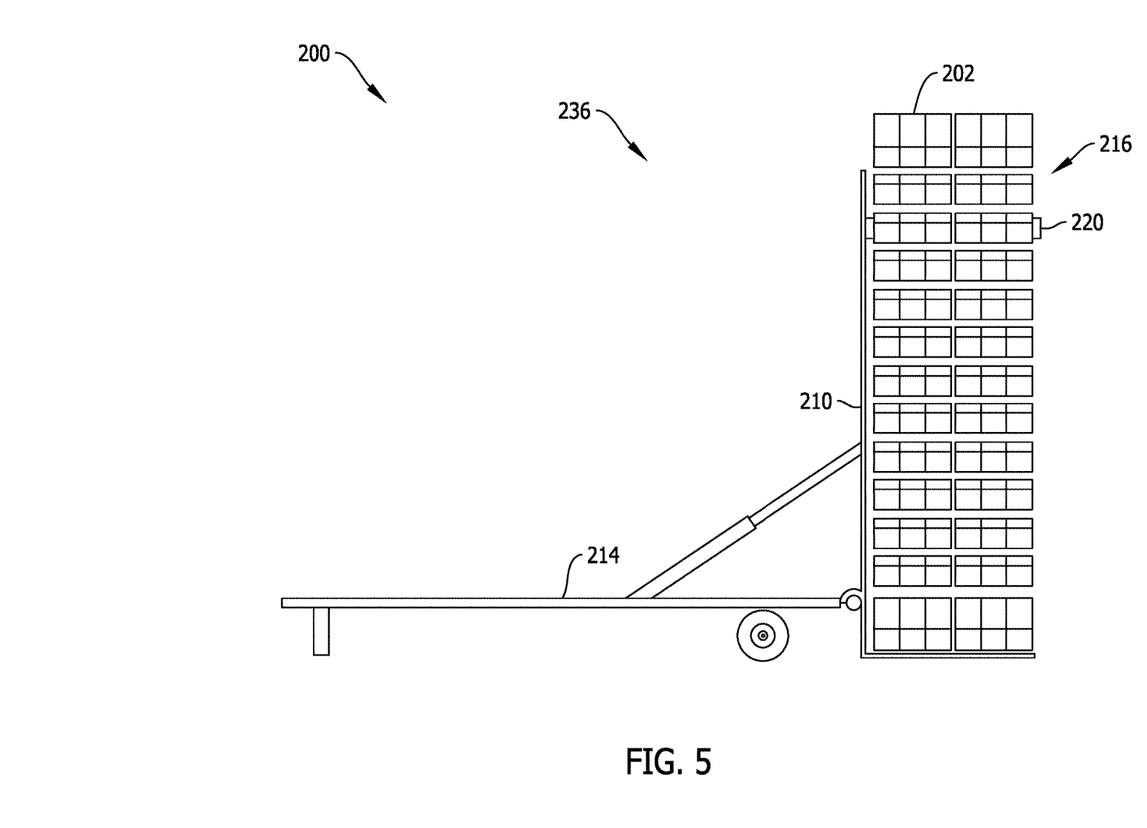
FIG. 5 is a schematic illustration of a mobile sub-assembly of the assembly shown in FIG. 3 in a first operational position.
Figure 6:
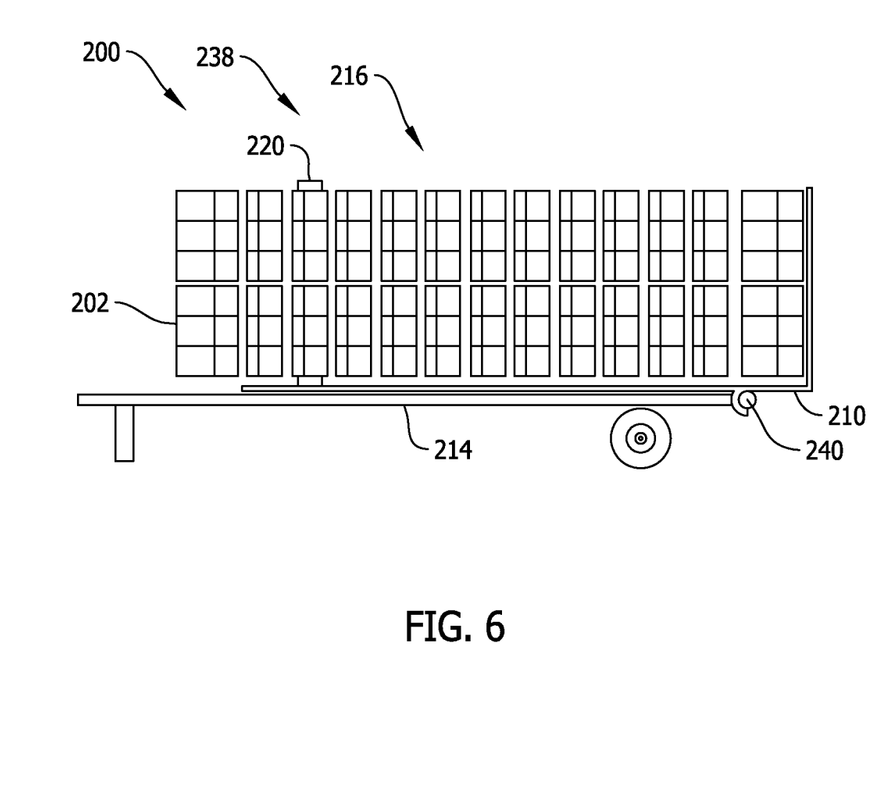
FIG. 6 is a schematic illustration of the mobile sub-assembly shown in FIG. 5 in a second operational position.

FIG. 5 is a schematic illustration of mobile sub-assembly 206 in a first operational position 236, and FIG. 6 is a schematic illustration of mobile sub-assembly 206 in a second operational position 238. In the exemplary implementation, arm portion 210 of mobile sub-assembly 206 is selectively actuated such that major axis 230 (shown in FIG. 4) of conveyor mechanism 216 is selectively oriented between a horizontal orientation and a vertical orientation. For example, first operational position 236 includes conveyor mechanism 216 in a substantially vertical orientation for loading or unloading vehicle seats 202 onto a loading platform (not shown in FIGS. 5 and 6), as will be described in more detail below, and second operational position 238 includes conveyor mechanism 216 in a substantially horizontal position for transporting vehicle seats 202 to different locations. Arm portion 210 is selectively actuated about a pivot point 240 defined between arm portion 210 and mobile platform 214. Alternatively, any actuating device that enables conveyor mechanism 216 to be positioned between horizontal and vertical orientations may be used that enables mobile sub-assembly 206 to function as described herein.

Figure 7:
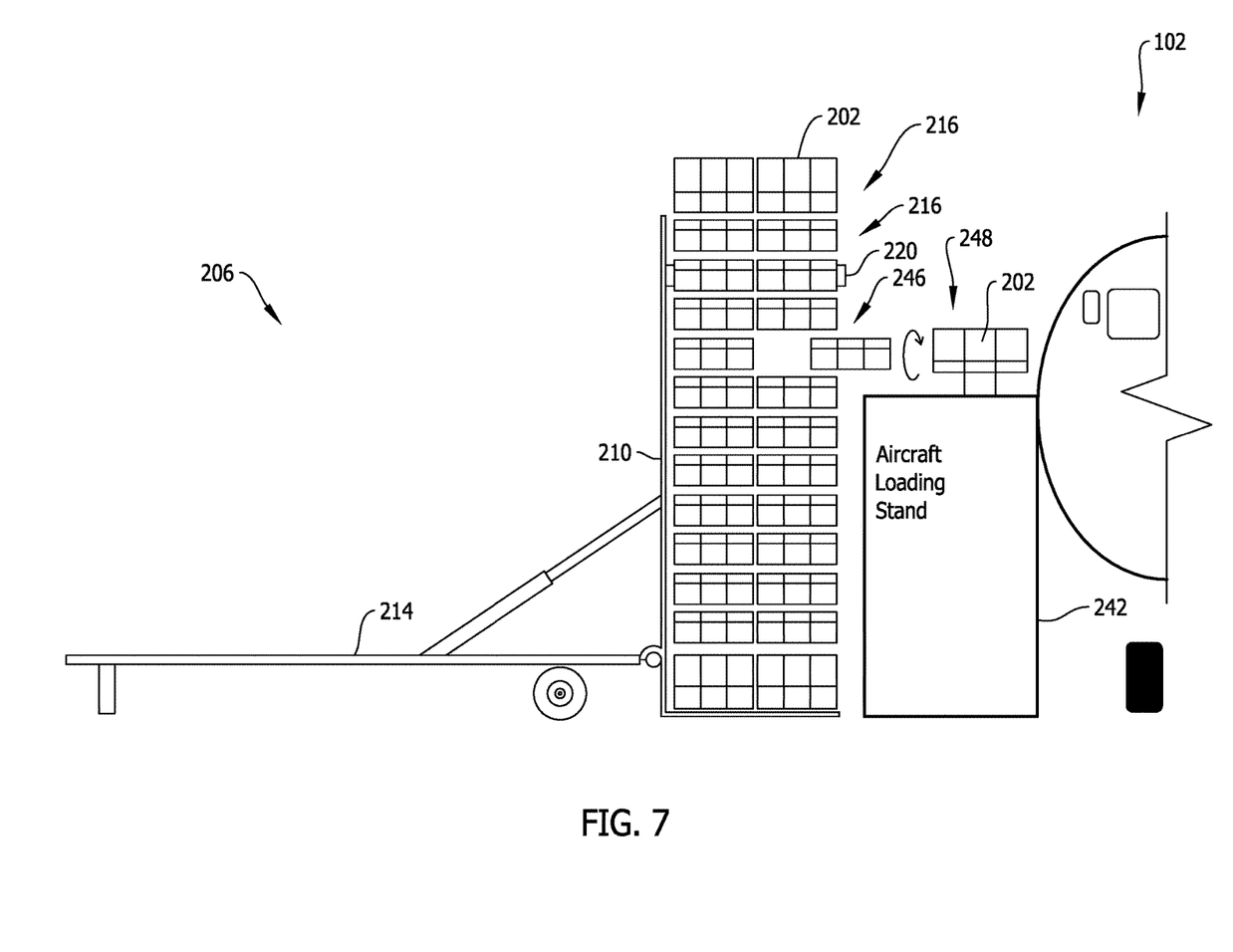
FIG. 7 is a schematic illustration of the mobile sub-assembly shown in FIG. 3 in a loading operational mode.

FIG. 7 is a schematic illustration of mobile sub-assembly 206 in a loading operational mode. In the exemplary implementation, mobile sub-assembly 206 is positioned adjacent to a loading platform 242, and mobile sub-assembly 206 is in first operational position 236. Loading platform 242 is sized to enable vehicle seats 202 to be unloaded onto loading platform 242, and then installed within a fuselage 244 of aircraft 102. Alternatively, mobile sub-assembly 206 may be positioned such that vehicle seats 202 may be loaded directly in a passenger door, a service door, an emergency door, or the like, without using loading platform 242.

In operation, mobile platform 214 positions conveyor mechanism 216 adjacent to loading platform 242, and conveyor mechanism 216 operates to position each row 232 of vehicle seats 202 into an unloading position 246 that substantially aligns with a working area 248 of loading platform 242. More specifically, rows 232 of vehicle seats 202 are unloaded onto loading platform 242, and conveyor mechanism 216 operates to position subsequent rows 232 of vehicle seats 202 into unloading position 246. This operation continues until conveyor mechanism 216 no longer has vehicle seats 202 coupled thereto. Mobile sub-assembly 206 is then available to offload the empty conveyor mechanism 216, and to pick up another full conveyor mechanism 216. Alternatively, conveyor mechanism 216 remains coupled to mobile sub-assembly 206, and additional vehicle seats 202 can be loaded onto conveyor mechanism 216.

Figure 8:
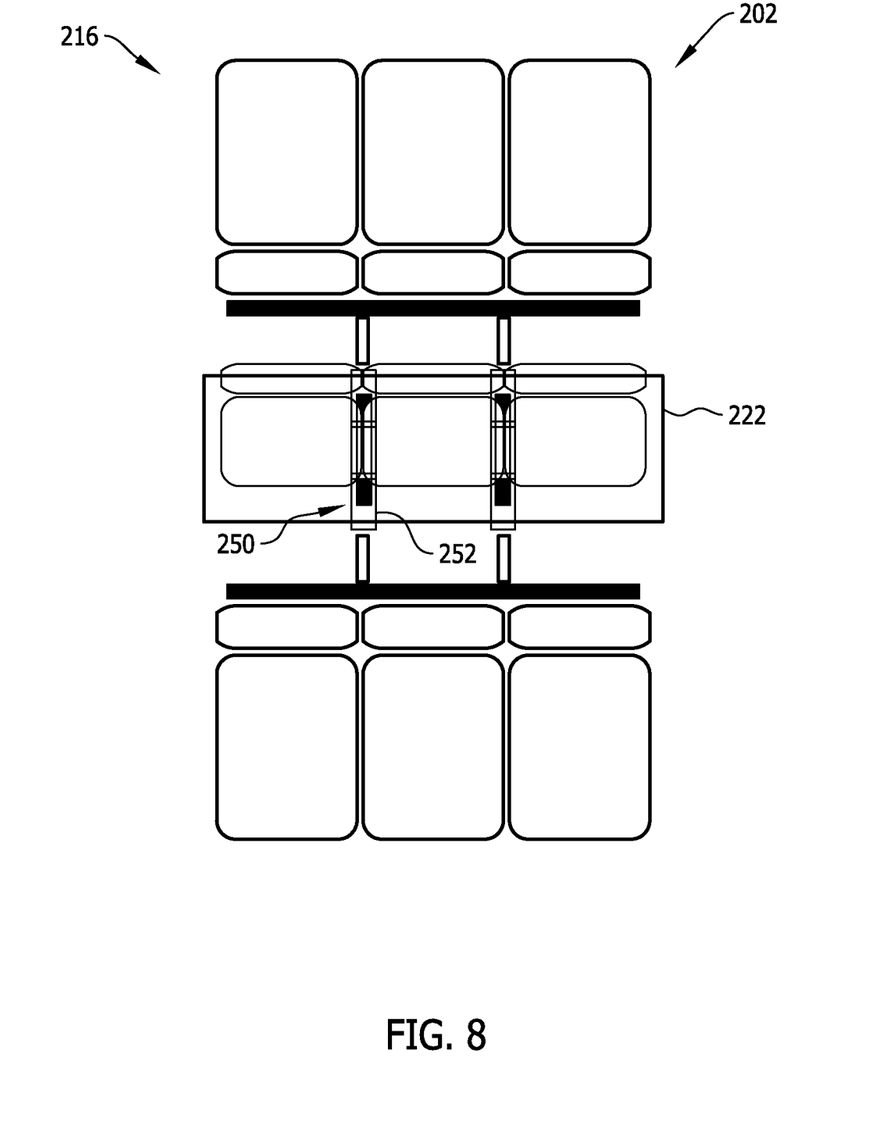
FIG. 8 is a schematic illustration of an exemplary seat interface that may be used with the conveyor mechanism shown in FIG. 4.
Figure 9:
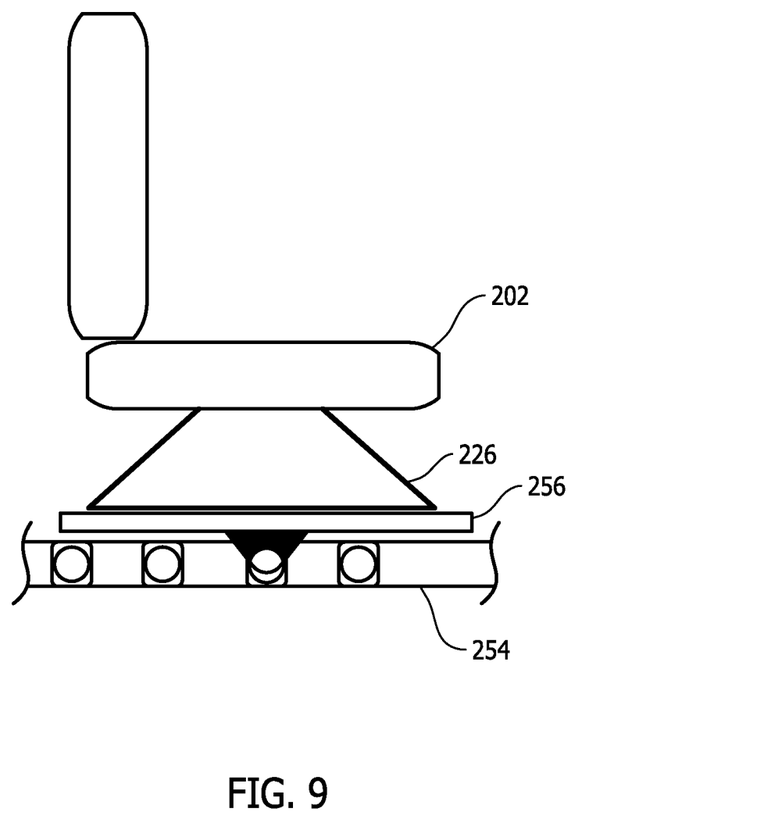
FIG. 9 is a side view schematic illustration of the seat interface shown in FIG. 8.

FIG. 8 is a schematic illustration of an exemplary seat interface 250 that may be used with conveyor mechanism 216, and FIG. 9 is a side view schematic illustration of seat interface 250. In the exemplary implementation, frame 222 includes a track 252 defined therein sized to receive a cable 254 extending thereabout. A seat platform 256 coupled to cable 254 defines seat interface 250. Legs 226 of vehicle seats 202 couple to seat platform 256, which is selectively rotated about frame 222 when cable 254 is actuated by a motorized device. As such, vehicle seats 202 are selectively positioned about frame 222.

A method of storing interior commodities, such as vehicle seats 202, for use in a vehicle, such as aircraft 102, is also described herein. The method includes coupling a first interior commodity to conveyor mechanism 216, actuating conveyor mechanism 216 such that the first interior commodity move from a first height relative to ground level 218 to a greater second height relative to ground level 218. The method also includes coupling a second interior commodity to conveyor mechanism 216 at the first height relative to ground level 218, and orienting conveyor mechanism 216 such that major axis 230 of conveyor mechanism 216 is in a substantially vertical orientation.

In one implementation, actuating conveyor mechanism 216 includes rotating the interior commodities relative to frame 222 of conveyor mechanism 216 such that the interior commodities are positionable at different locations along frame 222. In one implementation, the interior commodities are vehicle seats 202, and coupling the first and second interior commodities to conveyor mechanism 216 includes coupling the first and second interior commodities to conveyor mechanism 216 with an interface configured to mate with at least one leg 226 of vehicle seats 202. The method also includes orienting the vehicle seats 202 relative to conveyor mechanism 216 such that vehicle seats 202 are arranged in a plurality of rows 232, and orienting vehicle seats 202 relative to conveyor mechanism 216 such that vehicle seats 202 are arranged in series along outer portion 234 of frame 222 of conveyor mechanism 216. The method further includes orienting conveyor mechanism 216 such that the first height defines loading position 217 for coupling the interior commodities to conveyor mechanism 216, wherein the first height is substantially aligned with ground level 218.

A method of installing interior commodities, such as vehicle seats 202, within a vehicle, such as aircraft 102, is also described herein. The method includes positioning conveyor mechanism 216 adjacent to the vehicle, wherein conveyor mechanism 216 includes the interior commodities coupled thereto. The method also includes actuating conveyor mechanism 216 such that a first interior commodity is in unloading position 246 relative to the vehicle, offloading the first interior commodity towards the vehicle, and actuating conveyor mechanism 216 such that a second interior commodity is in unloading positon 246 relative to the vehicle.

In one implementation, actuating conveyor mechanism 216 includes rotating the interior commodities relative to frame 222 of conveyor mechanism 216 such that the interior commodities are positionable at different locations along frame 222. In one implementation, the method further includes positioning conveyor mechanism 216 adjacent to loading platform 242 such that unloading position 246 is substantially aligned with loading platform 242. In another implementation, the method further includes actuating arm portion 210 coupled to conveyor mechanism 216 such that major axis 230 of conveyor mechanism 216 is selectively oriented between a substantially vertical position and a substantially horizontal position.

In one implementation, the interior commodities are vehicle seats 202, and coupling the first and second interior commodities to conveyor mechanism 216 includes coupling the first and second interior commodities to conveyor mechanism 216 with an interface configured to mate with at least one leg 226 of vehicle seats 202. The method also includes orienting conveyor mechanism 216 such that unloading position 246 is defined at a greater height than ground level 218.

The implementations described herein relate to an assembly and methods of storing, transporting, and installing vehicle seats within an aircraft, for example. The assembly includes an actuatable conveyor mechanism that enables the vehicle seats to be selectively positioned in a desired loading or unloading position at different heights from a ground level. More specifically, the loading and unloading positions are dynamically selected to facilitate easily coupling and uncoupling the vehicle seats from the conveyor mechanism. As such, the assembly described herein enables a storage footprint of the interior commodities to be reduced, and facilitates transporting and installing the vehicles seats while reducing the likelihood of damage to the vehicle seats.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An assembly for use in storing or transporting vehicle seats, said assembly comprising:
   a stationary sub-assembly comprising:
      a base portion; and
      an arm portion extending from said base portion;
   a mobile sub-assembly configured to transport the vehicle seats; and
   a conveyor mechanism configured to selectively couple to said stationary sub-assembly and said mobile sub-assembly such that said conveyor mechanism is transferrable therebetween, wherein said conveyor mechanism comprises a major axis and a minor axis, and said conveyor mechanism is oriented such that the major axis is oriented substantially vertically when coupled to said arm portion of said stationary sub-assembly, wherein said conveyor mechanism further comprises:
      a frame; and
      a plurality of fastening devices configured to couple the vehicle seats to said conveyor mechanism, wherein said plurality of fastening devices are rotatable relative to said frame such that the vehicle seats are positionable at different locations along said frame.

2. The assembly in accordance with claim 1, wherein said plurality of fastening devices each comprise an interface configured to mate with at least one leg of the vehicle seats.

3. The assembly in accordance with claim 1, wherein said plurality of fastening devices are oriented such that the vehicle seats are arranged in a plurality of rows when coupled to said conveyor mechanism.

4. The assembly in accordance with claim 3, wherein said plurality of fastening devices are oriented such that the plurality of rows of vehicle seats are arranged in series along an outer portion of said frame.

5. The assembly in accordance with claim 1, wherein said conveyor mechanism is oriented such that the major axis of said conveyor mechanism is substantially aligned with a length of said arm portion.

6. The assembly in accordance with claim 1, wherein said mobile-sub-assembly comprises an arm portion configured to actuate such that the major axis of said conveyor mechanism is selectively oriented between a horizontal orientation and a vertical orientation.

7. The assembly in accordance with claim 1, wherein said mobile sub-assembly is configured to transport the vehicle seats to one or more locations, wherein said mobile sub-assembly comprises a base portion and an arm portion configured to couple to said conveyor mechanism.

8. The assembly in accordance with claim 1, wherein said base portion of said stationary sub-assembly comprises a stationary platform having a storage footprint of less than about 150 square feet when said conveyor mechanism is in a vertical orientation.

* * * * *